FIG. I.

INVENTOR
Lloyd B. Cherry

June 29, 1965  L. B. CHERRY  3,192,474
METHOD AND APPARATUS FOR DETERMINING THE QUALITY OF
A WELD OR SOLDER JOINT BY MEASUREMENT OF THE
DYNAMIC RESISTANCE OF THE JOINT
Filed March 30, 1961  4 Sheets-Sheet 3

INVENTOR
Lloyd B. Cherry
BY
Stevens, Davis, Miller & Mosher
ATTORNEYS

INVENTOR
Lloyd B. Cherry

United States Patent Office 3,192,474
Patented June 29, 1965

3,192,474
METHOD AND APPARATUS FOR DETERMINING THE QUALITY OF A WELD OR SOLDER JOINT BY MEASUREMENT OF THE DYNAMIC RESISTANCE OF THE JOINT
Lloyd B. Cherry, Beaumont, Tex., assignor to Texas Instruments Incorporated, Dallas, Tex., a corporation of Delaware
Filed Mar. 30, 1961, Ser. No. 99,573
19 Claims. (Cl. 324—65)

This invention relates to a method and apparatus for testing metal bonded connections and more particularly to a dynamic resistance test for determining the quality of a metal bonded electrical connection.

The term metal bonded connection as used in this specification and the appended claims means any connection between two elements by welding, soldering, or the like. The problem of determining the reliability of metal bonded electrical connections is of paramount importance and has been a troublesome one. In the past, the static measurement of contact resistance in metal bonded electrical connections has been extensively used as a method of predicting the reliability of the connections. However, when first made, a poor connection may have a low static resistance, and a static test will indicate that the connection is a good one, but, after an oxide has had time to form between the surfaces the connection may fail. Therefore, it is apparent that a test based on low static resistance would not reveal this type of poor contact.

The present invention provides a dynamic measurement of contact resistance in an electrical connection based on the phenomenon that the increment of resistance change across a metal bonded electrical connection due to an increment in applied pressure across the connection will be less in a good connection than in a poor connection. To state this in another way, in an imperfect weld or soldered connection the resistance can be reduced by the application of pressure thereto whereas in a good weld or soldered connection there will be little or no variation of resistance with the application of pressure. In accordance with the present invention, the above phenomenon is exploited in testing the quality of the metal bonded electrical connection by passing a current through the connection, impressing a periodically varying pressure on the connection while the current is passing therethrough to create periodically varying changes in the resistance of the connection inversely proportioned to the pressure variation, and detecting the periodically varying potential of the connection resulting from the changing resistance to measure the quality of the connection.

In testing welded connections, it has been found that each connection can be tested separately since good welded connections do not produce an appreciable potential variation. Therefore, if a significant potential variation is detected, it is an indication of a poor weld. However, in testing soldered connections it has been found that even good connections have a significant potential variation resulting from the pressure variation imposed thereon. Therefore, in testing soldered connections, one embodiment of the present invention compares the connection being tested with a known good soldered connection and detects only the difference in potential variation between the tested connection and the standard connection. This is accomplished in a manner insensitive to any static difference in resistance in the two connections which might be due, for example, to some slight difference in thickness between the connections rather than to a poor contact.

It is one object of the present invention to provide a dynamic resistance test method and apparatus for testing metal bonded connections.

It is another object of the present invention to provide a dynamic resistance test method and apparatus for testing the quality of metal bonded connections which is based on the phenomenon that the resistance change across the connection resulting from a varying pressure applied to the connection will be less in a good connection than in a poor connection.

It is a further object of the present invention to provide a dynamic resistance test wherein a substantially constant direct current is passed through the connection being tested while a periodically varying pressure is applied to the connection to produce a periodically varying potential drop across the connection, the magnitude of the periodically varying potential drop being indicative of the quality of the connection.

It is a still further object of the present invention to provide a dynamic resistance test for metal bonded electrical connections wherein an A.C. current is passed through the connection in the presence of a periodically varying pressure having the same frequency in a manner to increase the amplitude of the periodically varying potential across the connection to increase the sensitivity of the test.

It is a still further object of the present invention to provide a dynamic resistance test for metal bonded connections wherein an A.C. current is passed through the connection in the presence of a periodically varying pressure of the same frequency applied across the connection to produce an output signal in the form of a periodically varying potential which can be fed to a high pass filter which passes only the second harmonic of the potential frequency, the existence of the second harmonic indicating a bad weld and the absence of the second harmonic indicating a good weld.

It is a still further object of the present invention to provide a dynamic resistance test for metal bonded connections which is relatively simple and economical to employ, more reliable and effective than prior art tests, and readily adaptable to high production testing operations.

Other objects and features of novelty of the present invention will be specifically pointed out or will otherwise become apparent when referring, for a better understanding of the invention, to the following description taken in conjunction with the accompanying drawings, wherein.

Figure 1:
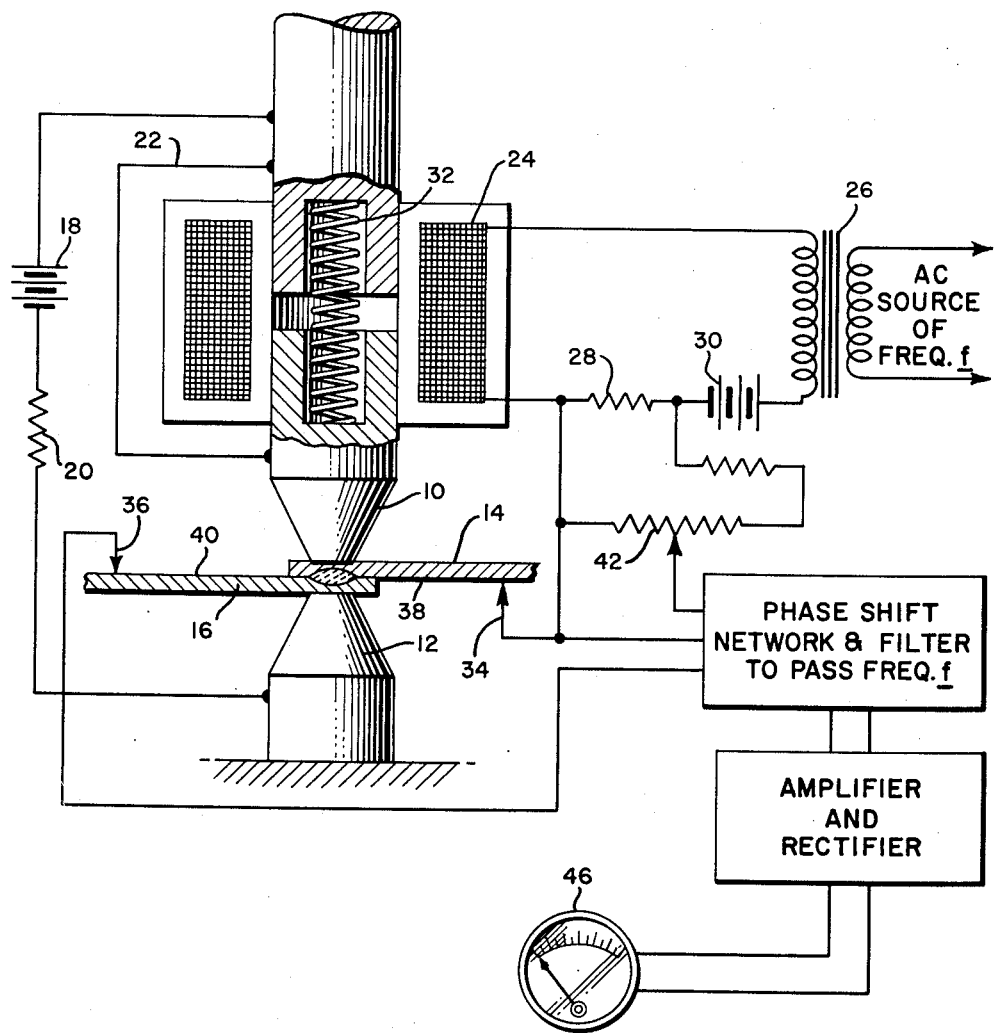
FIG. 1 is a schematic diagram of one embodiment of the present invention.

Referring to FIG. 1, one embodiment of the present invention is illustrated comprising electrodes 10 and 12 engaging opposite sides of a metal bonded electrical connection between elements 14 and 16. If the electrical connection is formed by resistance welding, it can be tested in accordance with the method of the present invention by employing the welding electrodes as the electrodes 10 and 12 so that the welded elements 14 and 16 do not have to be removed from between the electrodes after the welding operation has been completed. A battery 18 and resistance 20 are connected in series with the electrodes 10 and 12 to pass a direct current through the connection being tested. The resistance 20 has a value much larger than the resistance of the connection being tested so that the current passing through the connection will remain essentially constant. A conductor 22 is also provided to complete the circuit between the separated upper and lower portions of the electrode 10. A suitable spring 32 is positioned between the upper and lower portions of the electrode 10 to resiliently bias the lower portion of the electrode downwardly to exert a preloading force on the connection.

A solenoid 24 is positioned about the electrode 10 and energized by an A.C. source of frequency $f$ through a transformer 26 with a resistance 28 and battery 30 connected in series with the transformer and solenoid. During that half of the cycle when the potential of the A.C. source adds to that of the battery 30, the current through the solenoid 24 will be increased with a resultant pull on the electrode to decrease the pressure on the connection. This decrease in pressure results in an increase in the resistance of the connection which, together with the constant direct current flowing through the connection, produces an increase in the potential drop. During the other half of the cycle when the potential of the A.C. source substracts from that of the battery, the pull of the solenoid is decreased with a resultant increase in the pressure on the connection which decreases the potential drop across the connection.

The varying potential drop produced across the connection in this manner provides a signal having the same frequency $f$ as the A.C. source. Potential contacts 34 and 36 contacting the surfaces 38 and 40 of the elements 14 and 16, respectively, are provided to feed the signal to a filter to pass the frequency $f$. The passage of current from the A.C. source through the series resistance 28 results in a potential drop across the resistance, a portion of which can be used to oppose the signal from the connection in order that a "null" can be obtained, and the signal can be shifted in phase before being compared to the selected portion of the potential drop across the reresistance 28 in order that a good "null" can be obtained. A potentiometer 42 is connected across the resistor 28 and can be adjusted to determine the portion of the resistance 28 used to oppose the signal from the connection.

In the embodiment of FIG. 1, the difference between the signal and the opposing potential drop across the potentiometer is fed from the phase shift network and filter to an amplifier and rectifier and then to a meter 46 which provides a reading which is a direct indication of the quality of the connection. The potentiometer 42 is initially adjusted so that for a known good connection, the meter 46 gives a minimum reading, and for a bad connection gives a maximum reading.

As stated previously, if the metal bond connection between the elements 14 and 16 is a weld, the electrodes used in the welding operation may be used as the electrodes 10 and 12 so that the testing of the weld can be accomplished without removing the work from the machine. This assures the inspection of the weld immediately after it is made with a minimum of effort. By mounting the potential contacts so that they touch the surfaces of the elements that are bonded all changes in resistance due to deformation of the metal by the pressure of the electrodes will be ignored. The battery 30 may be eliminated if a permanent magnet is used in the core of the solenoid 24, or a half wave rectifier may be used in place of the battery 30 with some sacrifice of wave form.

In the embodiment of FIG. 1 static differences in potential are ignored. If it is desired to measure static differences in potential, a second A.C. source of higher frequency may be used to replace the battery 18 to serve as a carrier and changes in its amplitude, as indicated on the meter 46 (with proper filter changes) would indicate changes in the static values.

Figure 2:
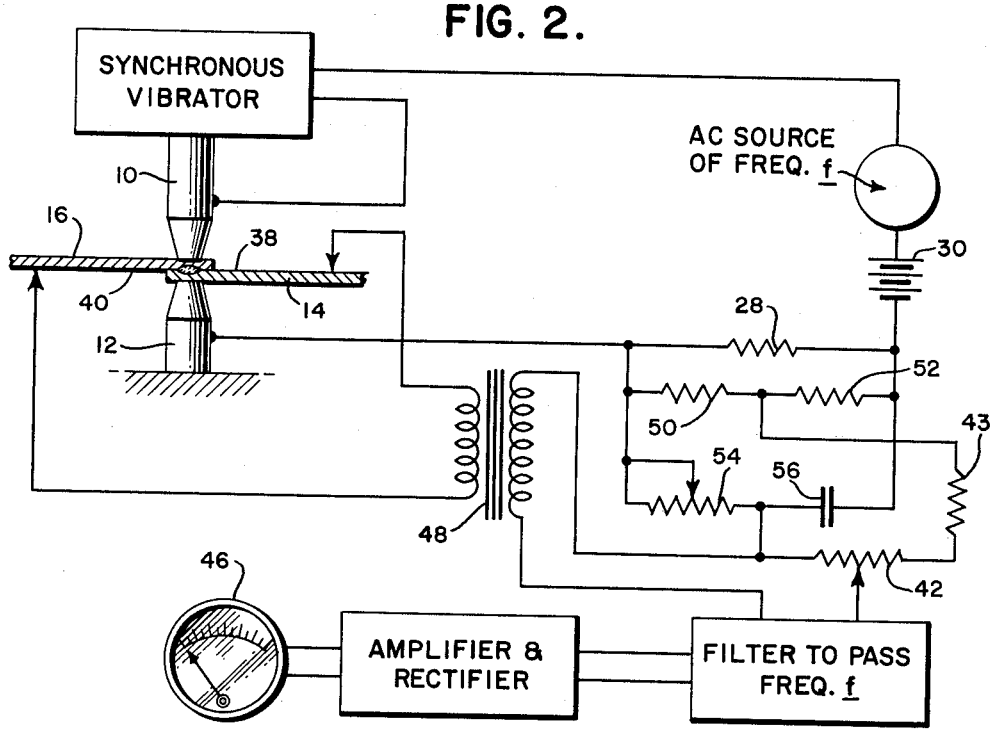
FIG. 2 is a schematic diagram of a second embodiment of the present invention.

Referring to FIG. 2, a second embodiment of the present invention is illustrated which differs from the embodiment of FIG. 1 primarily in that an A.C. current is passed through the connection between the elements 14 and 16 rather than a direct current. An A.C. source of frequency $f$ is connected in series with the battery 30, resistance 28, electrodes 12 and 10 and a synchronous vibrator mounted on top of the electrode 10 to vibrate it at the frequency $f$, but 180 degrees out of phase therewith, to exert the varying pressure on the connection. The potential contacts to the surfaces 38 and 40 are connected to the input of a transformer 48 having its output connected in series with a filter to pass the frequency $f$ and with a potentiometer and phase shifting circuit generating a bucking signal in phase with the signal produced by the potential drop across the connection, the bucking signal being equal to the potential variation across a known good connection as in the embodiment of FIG. 1. An amplifier and rectifier are connected to the filter to amplify and rectify the filtered difference signal, and a meter 46 is connected to provide a reading of the amplified signal as before. The phase shifting circuit comprises resistors 50 and 52 connected across the resistor 28 and a variable resistor 54 and condenser 56 connected across the resistors 50 and 52. The potentiometer 42 and series resistance 43 are connected as a bridge across the junction between the condeser 56 and variable resistor 54 and the junction between the resistors 50 and 52 to provide the above mentioned bucking signal.

By using a synchronous vibrator to vibrate the electrode 10 180 degrees out of phase with the energizing A.C. current, which also passes through the connection, a maximum current flows through the connection when the pressure on the weld is a minimum which means that the resistance will be a maximum with a resultant increased IR drop. Conversely, the current will be a minimum when the pressure is a maximum and the resistance a minimum which produces a very low IR drop. The net result is a maximum swing in the potential variation to produce a large signal, thus increasing the sensitivity of the device.

By feeding the signal from the potential contacts through the transformer 48, a considerable voltage gain is provided. This is very easily done since the source impedance (from one potential contact to the other) is very low. However, the user of the transformer requires the phase shifting circuit as shown in order to shift the phase of the potential across the series resistor 43 and potentiometer 42 180 degrees out of phase with the secondary potential of the transformer. Once the proper value of the variable resistor 54 and the phase shifting circuit is obtained for a good "null" its value need not be changed again when inspecting different welds. For testing different types of connections, the "null" may be obtained by adjusting the potentiometer 42.

Figure 3:
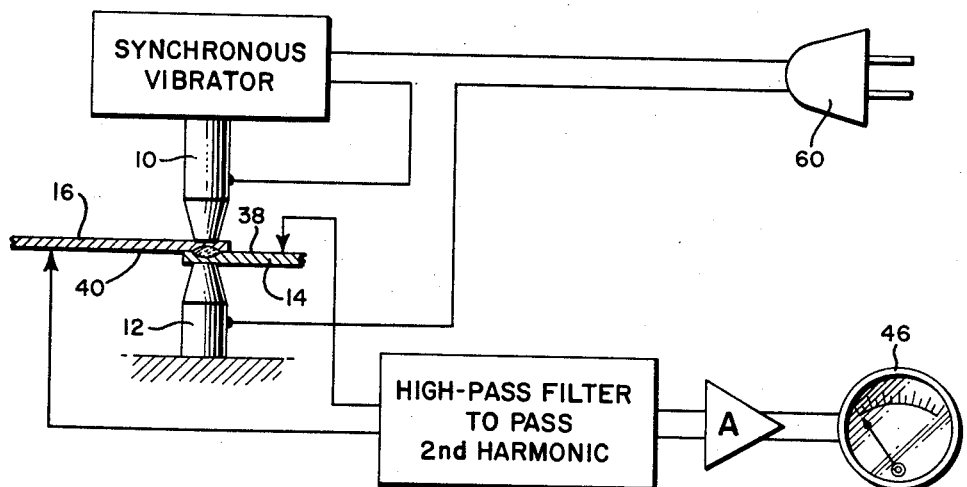
FIG. 3 is a schematic diagram of a third embodiment of the present invention.

Referring to FIG. 3, a third embodiment of the present invention is illustrated which is a variation of the embodiment of FIG. 2. The synchronous vibrator is mounted on top of the electrode 10 as before and can be energized from an A.C. source which is also passed through the electrodes 10 and 11 as before with the exception that the resistor 28 and battery 30 are not provided. If desired a plug 60 may be provided for connecting the synchronous vibrator to a conventional A.C. outlet of 60 c.p.s. In this embodiment detection of a bad connection is based on the discovery that in the case of a welded connection the second harmonic of the A.C. source frequency exists only if there is a bad connection. If the connection is good the second harmonic does not exist. Therefore by feeding the signal from the potential contacts engaging the surfaces 38 and 40 to a high pass filter which passes only the second harmonic and then to an amplifier and the meter 46, the meter will provide an indication as to whether there is or is not a second harmonic and, consequently, whether the connection is bad or good. If desired the meter could be replaced with a simple light indicator that lights for a bad connection and does not light for a good connection.

Figure 4:
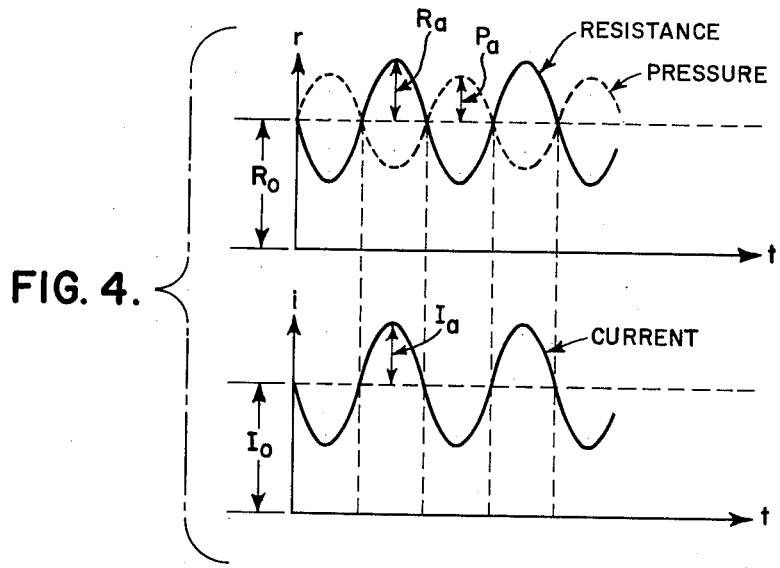
FIG. 4 is a graph illustrating the pressure, resistance and current curves produced by the embodiment of FIG. 3.

The explanation for the absence of the second harmonic for good welds can be explained by the following mathematical analysis made with reference to the graph of FIG. 4.

$$r = R_0 - R_a \sin \omega t$$
$$i = I_0 - I_a \sin \omega t$$

The potential drop across the connection will be:

$$ir = I_0 R_0 - (I_0 R_a + I_a R_0) \sin \omega t + I_a R_a \sin^2 \omega t$$
$$= I_0 R_0 - (I_0 R_a + I_a R_0) \sin \omega t + \frac{I_a R_a}{2} - \frac{I_a R_a}{2} \cos 2\omega t$$

From this equation it is observed that the second harmonic term would vanish if $R_a$ went to zero. This means that, as in the case of a good weld, when the pressure variation produces no resistance variation the second harmonic term would be absent. This substantiates the use of a high pass filter to eliminate the fundamental harmonic and simple determines the quality of the connection by the presence or absence of the second harmonic.

The above equation is valid provided the resistance is a linear function of pressure. If it is assumed that the resistance is not a linear function, but varies inversely as pressure, it can also be established mathematically that the second harmonic term would vanish in the case of a good weld. However, it is not believed that it is necessary, for the purposes of this specification, to follow through the mathematical analysis to prove this, since all that is necessary to practice the embodiment of FIG. 3 is to recognize that the second harmonic does vanish for a good weld and that the existence of the second harmonic is an indication of a bad weld.

Although the above embodiment discloses the pressure variation frequency and the current frequency as equivalent, it should be appreciated that the frequencies could be selected in any manner desired. Thus, the current frequency could be twice the pressure variation frequency, for example, naturally, the exact mathematical relation for a good weld would be different than that derived above since $\sin \omega t$ in the resistance equation and current equation are different. The IR drop could be readily obtained to determine the relation when $R_a$ approached zero; however, it is believed unnecessary to continue routine mathematical derivations.

Figure 5:
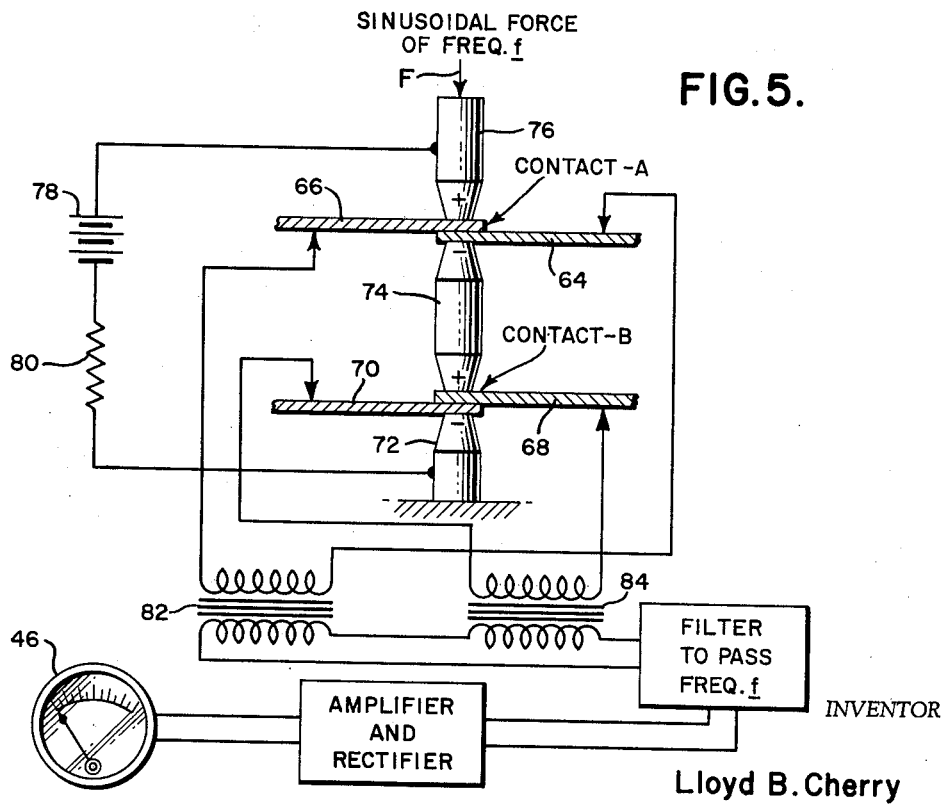
FIG. 5 is a schematic diagram of still another embodiment of the present invention wherein the electrical connection being tested is compared with a standard electrical connection of known good quality.

Referring to FIG. 5, a fourth embodiment of the present invention is illustrated which is particularly suitable for testing soldered connections. As stated at the outset of the specification the resistance of a good weld will not vary in response to variation in pressure across the weld. However, even in a good soldered connection, the resistance across the connection will vary somewhat in response to pressure variation. In the embodiment of FIG. 5, two elements 64 and 66 are joined together by a known good soldered connection designated as contact A and used as a standard against which the soldered connection of elements 68 and 70, designated as contact B, can be compared. Electrodes 72, 74 and 76 are arranged as illustrated to exert pressure equally on the contacts A and B and are connected in series with a battery 78 and resistor 80 to provide a substantially constant current through the contacts A and B. As in the case of the embodiment of FIG. 1 the resistance 80 has a value much larger than the resistance of the contacts A and B so that the current through the contacts will remain essentially constant.

A periodically varying force of frequency $f$, such as a sinusodial force, is applied to the electrode 76 as indicated by the arrow F to produce resistance variations in each of the contacts. The signal from the potential contacts connected to the elements 64 and 66 is fed to the input of a transformer 82 and the signal from the potential contacts connected to the elements 68 and 70 is fed to the input of a transformer 84. The transformer outputs are connected 180 degrees out of phase with one another to produce an output signal equal to the difference between the two signals. The output signal is fed to a filter to pass the frequency $f$, from the filter to the amplifier rectifier and then to the meter 46 to provide an indication of the quality of contact B.

Figure 6:
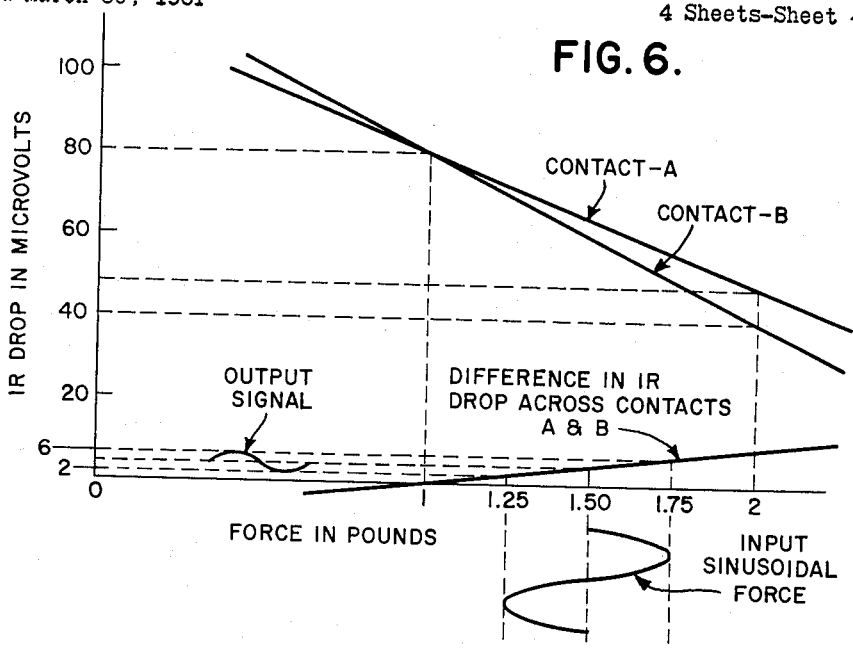
FIG. 6 is a graph of the potential drops across the connections of the embodiment of FIG. 5 versus the applied force across the connections.

Since the periodically varying force is applied equally across the contacts A and B to vary the resistance of the contacts as previously described, the substantially constant direct current flowing through the contacts produces two potential signals which are separately fed to the transformers 82 and 84. If the contact B is a bad soldered connection the signal to the transformer 84 will be greater than the signal to the transformer 82 and the meter will register this to indicate that the soldered connection is bad. Perhaps this can be better appreciated from the following description having reference to the graphs of FIGS. 6 and 7. In the graph of FIG. 6 the ordinate is scaled to indicate the IR drop across the contacts in microvolts and the abscissa is scaled to indicate the force applied by the electrodes in pounds. The curve of contact A has a value of $80 \times 10^{-6}$ ohm under a force of one pound and drops to $48 \times 10^{-6}$ ohm under a force of two pounds. The curve of contact B has a value of $80 \times 10^{-6}$ ohm under a force of one pound but drops to $40 \times 10^{-6}$ ohm under a force of two pounds. If we consider the force as varying sinusoidally from 1.25 pounds to 1.75 pounds as illustrated and assume linearity for the curves for this small increment, the differences in the resistances of the two contacts will vary from $6 \times 10^{-6}$ ohm to $2 \times 10^{-6}$ ohm. If a constant current of one ampere is flowing, an A.C. output signal of $2 \times 10^{-6}$ volt peak will be fed to the filter and amplifier, and if the amplifier has a gain of 120 db, the meter would read a peak value of two volts. The output signal would appear as illustrated, varying sinusoidally from two to six volts with the same frequency as that of the input force.

Figure 7:
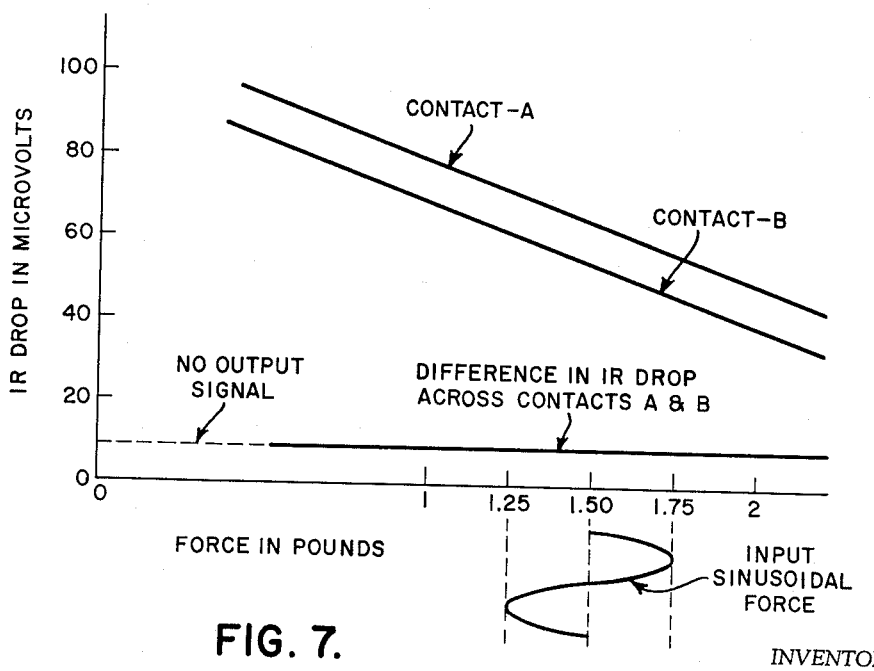
FIG. 7 is a graph similar to that of FIG. 6 illustrating curves for connections of the same quality.

Referring to the graph of FIG. 7 wherein the slope of the contacts A and B is the same, a "null" would result indicating that the two contacts were alike although their static values of resistance differ. The graph of FIG. 7 clearly illustrates and emphasizes an important feature of the method of the present invention in that it will detect differences in the rate of variation of resistance with respect to force regardless of the static values of the resistance. A second important feature is that all other resistances in the circuit are of no consequence since the potential contacts are, as in the previous embodiments, made to the surfaces which are soldered together.

If it is desired to detect static differences in resistance between the contacts A and B, an A.C. source of higher frequency than the frequency $f$ may be used in place of the battery 78. The A.C. frequency would then appear in the output as a carrier with the frequency $f$ of the force F superimposed upon it as a modulation. The absence of an output would indicate both static and dynamic equality of the contact resistance. Whereas, the presence of a constant amplitude carrier in the output would indicate a static inequality but a dynamic equality.

Of course the embodiment of FIG. 5 might be used to compare any two resistance elements which vary with force, such as strain gauges, carbon-button, microphones and similar devices. The method might also be used to test the hardness of a conducting material since an increasing force will produce a decreased thickness and an increased area which will result in a decreased resistance. The softer the material the more pronounced will be this effect.

In each of the four embodiments, the required variations in force for a given signal amplitude will be less if a small preload is used. However, to provide continuity of the current circuit, a positive pressure should be maintained between the electrodes through the entire cycle. Further, in the embodiment of FIG. 2 where an A.C. current is passed through the connection, the D.C. component of the A.C. current should preferably be larger than the maximum A.C. component so that the direction of current flow doesn't change.

There are numerous distinct characteristics of the present invention which simplify the electrical design. First, the output is a potential rather than a current which means that the position and pressure of the potential contacts on the surfaces which are joined is not critical; second, the output impedance is resistive and very low (a few microhms): third, the output signal varys periodically which lends itself to stable amplification: fourth, the output is a single frequency which further simplifies the problem of amplification: and fifth the output signal can be displayed in several ways, such as on a suitable meter, on an oscilliscope, or even by a light bulb as explained in connection with the embodiment of FIG. 3.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. The method of testing a metal bonded connection which includes the steps of impressing a cyclically varying pressure on a metal bonded connection, and detecting any variation in the resistance across the connection resulting from the pressure variation.

2. The method of testing a metal bonded connection which includes the steps of passing a current through a metal bonded connection, impressing a cyclically varying pressure on the connection while the current is passing therethrough, and detecting any variation in the potential across the connection resulting from the pressure variation.

3. The method of testing a metal bonded connection which includes the steps of passing a substantially constant direct current through a metal bonded connection, impressing a cyclically varying pressure on the connection while the direct current is passing therethrough, and detecting any variation in the potential across the connection resulting from the pressure variation.

4. The method of testing a metal bonded connection, which includes the steps of, passing an A.C. current through a metal bonded connection, impressing a periodically varying pressure on the connection having the same frequency as the A.C. current and while the A.C. current is passing through the connection, and detecting any variation in the potential across the connection resulting from the pressure variation.

5. The method of testing a metal bonded connection, which includes the steps of, passing an A.C. current through a metal bonded connection, impressing a periodically varying pressure on the connection 180 degrees out of phase with the A.C. current and while the A.C. current is passing through the connection, and detecting any variation in the potential across the connection resulting from the pressure variation.

6. The method of testing a metal bonded connection, which includes the steps of, passing an A.C. current through a metal bonded connection, impressing a periodically varying pressure on the connection having the same frequency as that of the A.C. current, and detecting the existence of a second harmonic in the potential variation across the connection resulting from the pressure variation.

7. The method of testing a metal bonded connection, which includes the steps of, passing a current through a first metal bonded connection of known good quality and through a second metal bonded connection to be tested, exerting a varying pressure equally on both of the connections, and detecting the difference in the potential variation across each of the connections resulting from the pressure variation.

8. Apparatus for testing a metal bonded connection comprising first means adapted to exert a pressure on the metal bonded connection to apply a pressure thereon, second means cooperating with said first means to vary the pressure thereon on the connection, third means for passing a current through the connection, and fourth means for detecting any potential variation resulting from the pressure variation.

9. Apparatus for testing a metal bonded connection comprising first means adapted to exert a pressure on the electrical connection, second means for passing a current through the connection, third means for periodically varying the pressure of the first means on the connection, fourth means for generating a signal in accordance with the potential variation across the connection resulting from the pressure variation, fifth means for generating a bucking signal equivalent to the potential variation in a known good connection, and sixth means for generating a signal equal to the difference between the first two mentioned signals.

10. Apparatus for testing a metal bonded connection comprising electrode means adapted to exert a pressure on the metal bonded connection, a source of direct current connected in series with said electrode means to pass a substantially constant current through the connection, means cooperating with said electrode means to produce a cyclical variation in the pressure thereof on the connection, and means for detecting any potential variation across the connection resulting from the pressure variation.

11. Apparatus for testing a metal bonded electrical connection comprising electrode means adapted to exert a pressure on the connection, a source of direct current connected to said electrode means to pass a substantially constant current through the connection, a solenoid mounted on said electrode means, a source of A.C. current for energizing said solenoid to vary the pressure of the electrode means on the connection, and means for detecting any potential variation across the connection resulting from the pressure variation.

12. Apparatus for testing a metal bonded connection comprising electrode means adapted to exert a pressure on the connection, a source of direct current connected to the electrode means to pass a substantially constant current through the connection, an A.C. source, force applying means energized by said A.C. source for varying the pressure of the electrode means on the connection at the same frequency as that of the A.C. source, means for generating a signal in accordance with the potential variation across the connection resulting from the pressure variation, circuit means connected to said A.C. source for generating a bucking signal having the same frequency as that of the A.C. source and equivalent to the potential variation across a known good connection, and means for detecting the difference between the two signals.

13. Apparatus for testing a metal bonded connection comprising electrode means adapted to exert a pressure on the connection, force applying means for varying the pressure applied by the electrode means, an A.C. source for energizing said force applying means and connected in series with said electrode means to pass an A.C. current through the connection, said force applying means varying the pressure applied by the electrode means at the same frequency as that of the A.C. source but 180 degrees out of phase therewith, and means for detecting the potential variation across the connection resulting from the pressure variation.

14. The invention as defined in the claim 13 wherein said detecting means comprises means for generating a signal in accordance with potential variation across the connection resulting from the pressure variation circuit means connected to said A.C. source for generating a bucking signal in phase with said first mentioned signal and equivalent to the potential variation across a known good connection, and means for detecting the difference between the two signals.

15. The invention as defined in claim 14 wherein said difference detecting means includes a transformer having the input thereof energized by said first mentioned signal and the output thereof connected to said circuit means so that the bucking signal opposes the first mentioned signal in the output, filter means connected to the output of the transformer for filtering the difference signal from the output, means connected to the filter means for amplifying the signal after it has been filtered, and means connected to said amplifier for reading the amplified signal.

16. Apparatus for testing a metal bonded connection comprising electrode means adapted to exert a pressure on the connection, a source of A.C. current connected to the electrode means to pass the A.C. current through the connection, vibrating means energized by said A.C. source for vibrating the electrode means to vary the pressure on the connection at the same frequency as that of the A.C. source and 180 degrees out of phase therewith, and means for detecting the existence of a second harmonic in the potential variation across the connection resulting from the pressure variation.

17. The invention as defined in claim 16 wherein said detecting means comprises a high pass filter connected across the connection by potential contacts to pass said second harmonic, an amplifier connected to the high pass filter to amplify any second harmonic passing through the filter, and means for reading the amplified signal.

18. Apparatus for testing a metal bonded connection comprising electrode means adapted to exert a pressure equally on a first metal bonded connection to be tested and a second metal bonded connection of known good quality, force applying means for varying the pressure of the electrode means on each of the connections equally, a source of direct current connected to said electrode means to pass a substantially constant direct current through each of the connections, means for generating a first signal in accordance with the potential variation across the first connection resulting from the pressure variation, means for generating a second signal in accordance with the potential variation across the second connection resulting from the pressure variation thereacross, and means for detecting the difference between the two signals as an indication of the quality of the connection being tested.

19. The invention as defined in claim 18 wherein said force applying means varies the pressure at a frequency $f$, and said detecting means comprises means for placing the two signals in opposition with one another to produce an output signal equal to the difference between the two, filter means to pass the frequency $f$ for filtering said output signal, an amplifier connected to said filter means to amplify the filtered signl, and means connected to said amplifier for reading the amplified signal.

References Cited by the Examiner
UNITED STATES PATENTS

| | | | |
|---|---|---|---|
| 2,142,619 | 1/39 | Sciaky | 324—64 |
| 2,579,316 | 12/51 | Hall et al. | 324—65 |
| 3,005,153 | 10/61 | Berkley et al. | 324—65 |

OTHER REFERENCES

Knowlton, A. E.: "Standard Handbook for Electrical Engineers," eighth edition, 1949; McGraw-Hill Book Company, Inc., New York, page 1139, paragraph 499 relied upon.

WALTER L. CARLSON, *Primary Examiner.*

FREDERICK M. STRADER, *Examiner.*